Patented Sept. 26, 1944

2,359,039

UNITED STATES PATENT OFFICE 2,359,039

PRODUCTION OF ARYLOXY KETONES

Charles D. Hurd, Evanston, Ill., assignor to Commercial Solvents Corporation, Terre Haute, Ind., a corporation of Maryland No Drawing. Application September 11, 1941, Serial No. 410,371

11 Claims. (Cl. 260—590)

My invention relates to a novel process for the production of aryloxy ketones. More particularly, it relates to a process for the production of aryloxy ketones having the following structural formula:

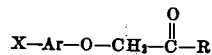

in which Ar is an aromatic nucleus, the substituent X represents either hydrogen, hydroxyl, halogen or a methoxyl group, said substituent being attached to said aryl group and R is either aryl, benzyl or alkyl.

In the past aryloxy ketones of the type included by the above formula have been prepared by reacting equivalent quantities of a sodium aryloxide and an alpha-monohalogenated ketone in the presence of solvents, such as benzene, xylene, or toluene. Such a procedure, however, has been found to be highly impractical since the conditions thus provided favor the occurrence of undesirable side reactions, such as, for example, condensation of the alpha-monohalogenated ketone, and as a result, comparatively low yields are obtained, i. e., about 16 per cent.

I have now discovered that aryloxy ketones of the type mentioned above may be prepared in excellent yields by the direct reaction of the desired phenol and alpha-monohalogenated ketone in the presence of a base and a suitable catalyst. Briefly, the process upon which the present invention is based, consists of adding to the desired phenol an alpha-monohalogenated ketone in a molecular ratio of about one mole of the phenol to approximately two moles of the alpha-monohalogenated ketone, the reaction being carried out in an inert solvent and in the presence of a base and suitable catalyst.

In its preferred embodiment, my invention is effected by first dissolving the entire quantity of the phenolic compound in an inert solvent containing a suitable base, said base being present in an amount which is equal to approximately one-third of the phenol employed. After refluxing this mixture for a short period of time, a solution which has preferably been permitted to stand overnight and which contains the desired alpha-mono-halogenated ketone and catalyst in a suitable solvent, is then slowly added to said mixture. After approximately one-fourth of the latter solution has been added, a second quantity of base, approximately equal to the amount originally used, is added to the mixture together with a sufficient quantity of solvent to maintain said mixture at the proper dilution. A second portion of alpha-monohalogenated ketone is then introduced and is followed by the addition of the base in an amount approximately equal to that previously used. This procedure is repeated until all of the alpha-monohalogenated ketone, and about one mole of said base per mole of the phenol employed, has been added. Completion of the reaction is evidenced by the disappearance of the base which is ordinarily insoluble in the reaction medium employed. At the conclusion of the reaction, the crude mixture is filtered and the filtrate containing the aryloxy ketone distilled under reduced pressure. The aryloxy ketones thus produced are generally soluble in ether, and benzene, and are fairly stable on standing. However, the aryloxy ketones derived from the lower alpha-monohalogenated ketones, such as chloroacetone, although being substantially colorless on distillation, darken rather readily on standing.

The alpha-monohalogenated ketones which may be employed in my invention may be selected from a wide range of compounds. As examples of such materials there may be mentioned chloroacetone, 3-chloro-2-butanone, chloroacetophenone, chloromethyl benzyl ketone, chloromethyl propyl ketone, the bromo derivatives of the aforesaid ketones, and the like. The phenolic compounds that may be utilized in my process may also be selected from a comparatively large group of materials, such as, for example, alpha- and beta-naphthols, anthranol, phenol, resorcinol, the ortho-, meta- and para-cresols, para-chlorophenol, and the like.

The basic materials employed in my process may be any of the substances that are derived from a strong base and a weak acid. Sodium carbonate and potassium carbonate are typical of such materials. The quantity of base employed may vary. In general, however, I have found it preferable to employ said base in a ratio of approximately one mole per mole of the phenolic compound utilized.

The solvent employed in carrying out my process is preferably acetone. However, any of a number of other common solvents such as 2-butanone, 2-pentanone, benzene, etc., may be used, their principal function being to bring the reacting substances together. Such solvents must be substantially inert with respect to the reactants under the reaction conditions employed.

The catalyst utilized may be selected from a wide range of ionizing iodine-containing salts, such as, for example, sodium iodide, potassium iodide, calcium iodide, ammonium iodide, and the like. The concentration of catalysts to be employed is not critical, and may be varied over a considerable range. Concentrations of catalyst ranging from 0.01 to 0.5 gram atom per mole of the phenol utilized, will generally be satisfactory. An appreciable excess of catalyst will not interfere with the reaction, but of course a large excess of such material should be avoided both from the standpoint of economy and ease of manipulation. The minimum amount of catalyst which is required for any particular set of reaction conditions, can readily be determined by preliminary experiment.

The examples which follow are illustrative of the subject matter included by the present invention. However, it is to be specifically understood that my invention is in no way limited thereto.

*Example I*

A mixture consisting of 100 parts of phenol, 30 parts of potassium carbonate, and 130 parts of acetone was stirred and refluxed for a period of fifteen minutes, after which a solution consisting of 181 parts of chloroacetone, 120 parts of acetone, and 3 parts of potassium iodide was added dropwise. When approximately one-fourth of the latter solution had been added, 30 parts of potassium carbonate and acetone in an amount sufficient to maintain the desired dilution of reactants in the mixture, was added. A second portion of the chloroacetone solution was then introduced and the above procedure repeated until 138 parts of potassium carbonate and all of the chloroacetone solution had been added. At the conclusion of the introduction of these materials, the reaction mixture was continuously stirred until substantially all of the granular potassium carbonate particles had changed to crystalline potassium chloride particles. The mixture was then filtered and the precipitate washed with acetone. The filtrate was concentrated and the residue distilled under reduced pressure. The fraction distilling at 117–120 (19 mm.) was collected and consisted of substantially pure phenoxyacetone. The quantity of phenoxyacetone thus obtained amounted to 147 parts, corresponding to a yield of 92.5%.

*Example II*

A mixture consisting of 59 parts of beta-naphthol, 57 parts of potassium carbonate, and 140 part of acetone was placed in a suitable reaction vessel, after which there was added thereto, with thorough agitation, a solution containing 50 parts of chloracetone, 3 parts of potassium iodide, and 40 parts of acetone. The latter solution was added dropwise to the beta-naphthol mixture which was maintained at reflux temperature throughout the introduction of the chloracetone. At the conclusion of the addition of the chloroacetone solution, stirring and refluxing were continued for a period of six hours, after which the resulting mixture was stirred at room temperature until the granules of potassium carbonate were substantially replaced by crystalline potassium chloride. This mixture was next filtered and the residue washed several times with acetone. The crude beta-naphthoxyacetone was precipitated from the filtrate by means of the addition of water, after which it was recrystallized several times from methanol and water until a constant melting point of 78° C. was reached. The quantity of beta-naphthoxyacetone produced as described above, amounted to 70 parts, or 85 per cent of the theoretical yield.

The present invention is generally applicable to the production of aryloxy ketones from a phenol and an alpha-monohalogenated ketone in the presence of a suitable base and an ionized iodine-containing salt. Materials, other than those employed in the above examples, can, of course, be utilized as catalysts, and the procedures of the examples may be modified in numerous respects. For example, highly satisfactory yields of the desired aryloxy ketone are obtained by reacting the entire amount of the phenolic compound with the calculated quantity of alpha-monohalogenated ketone in the presence of the necessary amount of catalyst and base at the reflux temperature of the reaction mixture. It is therefore to be specifically understood that I do not desire to restrict myself to a process for preparing aryloxy ketones as set forth by the above examples. On the contrary, it is intended that the present invention shall cover, by the terminology employed in the appended claims, all features of patentable novelty which are inherent therein.

Having now described my invention, what I claim is:

1. In a process for the production of monocyclicaryloxy ketones, the step which comprises reacting an alkali metal salt of a monocyclic phenol with an alpha-monohalogenated ketone in the liquid phase and in the presence of a catalyst for the reaction consisting of an ionizing iodine-containing salt.

2. In a process for the production of naphthoxy ketones, the step which comprises reacting an alkali metal salt of naphthol with an alpha-monohalogenated ketone in the liquid phase and in the presence of a catalyst for the reaction consisting of an ionizing iodine-containing salt.

3. In a process for the production of phenoxyacetone, the step which comprises reacting an alkali metal salt of phenol with chloroacetone in the liquid phase and in the presence of a catalyst for the reaction consisting of an ionizing iodine-containing salt.

4. In a process for the production of beta-naphthoxyacetone, the step which comprises reacting an alkali metal salt of beta-naphthol with chloroacetone in the liquid phase and in the presence of a catalyst for the reaction consisting of an ionizing iodine-containing salt.

5. In a process for the production of phenoxyacetone, the step which comprises reacting an alkali metal salt of phenol with chloroacetone in the liquid phase and in the presence of a catalyst for the reaction consisting of potassium iodide.

6. In a process for the production of beta-naphthoxyacetone, the step which comprises reacting an alkali metal salt of beta-naphthol with chloroacetone in the liquid phase and in the presence of a catalyst for the reaction consisting of potassium iodide.

7. In a process for the production of aryloxy ketones having the following structural formula:

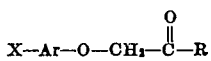

in which Ar is an aromatic nucleus, the substituent X represents a member selected from the class consisting of hydrogen, hydroxyl, halogen and a methoxyl group, said substituent being attached to said aryl group, and R is a member of the class consisting of alkyl, aryl, and benzyl groups, the step which comprises reacting an alkali metal salt of a phenolic compound with an alpha-monohalogenated ketone in the liquid phase and in the presence of a catalyst for the reaction consisting of an ionizing iodine-containing salt.

8. In a process for the production of aryloxy ketones having the following structural formula:

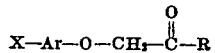

in which Ar is an aromatic nucleus, the substituent X represents a member selected from the class consisting of hydrogen, hydroxyl, halogen and a methoxyl group, said substituent being attached to said aryl group, and R is a member of the class consisting of alkyl, aryl, and benzyl groups, the step which comprises reacting an alkali metal salt of a phenolic compound with an alpha-monohalogenated ketone in the liquid phase and in the presence of a catalyst for the reaction consisting of potassium iodide.

9. In a process for the production of monocyclicaryloxy ketones, the step which comprises reacting an alkali metal salt of monocyclic phenol with an alpha-monohalogenated ketone in the liquid phase and in the presence of an alkali metal carbonate, and an alkali metal carbonate, and a catalyst for the reaction consisting of potassium iodide.

10. In a process for the production of naphthoxy ketones, the step which comprises reacting an alkali metal salt of naphthol with an alpha-monohalogenated ketone in the liquid phase and in the presence of an alkali metal carbonate, and an alkali metal carbonate, and a catalyst for the reaction consisting of potassium iodide.

11. In a process for the production of aryloxy ketones having the following structural formula:

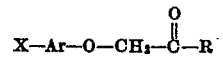

in which Ar is an aromatic nucleus, the substituent X represents a member selected from the class consisting of hydrogen, hydroxyl, halogen and a methoxyl group, said substituent being attached to said aryl group, and R is a member of the class consisting of alkyl, aryl, and benzyl groups, the step which comprises reacting the potassium salt of a phenolic compound with an alpha-monohalogenated ketone in the liquid phase and in the presence of a catalyst for the reaction consisting of an ionizing iodine-containing salt.

CHARLES D. HURD.

CERTIFICATE OF CORRECTION.

Patent No. 2,359,039. September 26, 1944.

CHARLES D. HURD.

It is hereby certified that error appears in the printed specification of the above numbered patent requiring correction as follows: Page 2, first column, line 52, Example 2, for the word "part" read --parts--; line 59, for "chloracetone" read --chloroacetone--; page 3, first column, lines 25 and 26, claim 9, and second column, lines 5 and 6, claim 10, for the words "in the presence of an alkali metal carbonate, and an alkali metal carbonate, and a catalyst" read --in the presence of a catalyst--; and that the said Letters Patent should be read with this correction therein that the same may conform to the record of the case in the Patent Office.

Signed and sealed this 30th day of January, A. D. 1945.

Leslie Frazer (Seal) Acting Commissioner of Patents.